United States Patent
Stieler et al.

(10) Patent No.: US 7,263,975 B2
(45) Date of Patent: Sep. 4, 2007

(54) PLASTIC COATED METAL FUEL RAIL

(75) Inventors: David C. Stieler, Lake Orion, MI (US); Dale L. Sleep, Clarkson, MI (US)

(73) Assignee: Dana Corporation, Toledo, OH (US)

( * ) Notice: Subject to any disclaimer, the term of this patent is extended or adjusted under 35 U.S.C. 154(b) by 95 days.

(21) Appl. No.: 11/042,965

(22) Filed: Jan. 25, 2005

(65) Prior Publication Data

US 2006/0162697 A1    Jul. 27, 2006

(51) Int. Cl.
F02M 55/02    (2006.01)

(52) U.S. Cl. ................. 123/456; 123/468; 123/469

(58) Field of Classification Search ............ 123/456, 123/468, 469; 428/36.91, 34.7, 35.2, 35.3, 428/35.8; 138/130, 133, 138, 144
See application file for complete search history.

(56) References Cited

U.S. PATENT DOCUMENTS

| | | | |
|---|---|---|---|
| 3,749,621 A | | 7/1973 | Shoffner |
| 4,198,739 A | | 4/1980 | Budinger et al. |
| 4,234,781 A | | 11/1980 | Flink |
| 4,358,887 A | | 11/1982 | Creps |
| 4,548,338 A | | 10/1985 | Sander |
| 4,758,455 A | * | 7/1988 | Campbell et al. .......... 428/35.9 |
| 5,036,889 A | | 8/1991 | Pherigo |
| 5,129,544 A | | 7/1992 | Jacobson et al. |
| 5,198,053 A | | 3/1993 | Duncan |
| 5,398,729 A | * | 3/1995 | Spurgat ..................... 138/133 |
| 5,590,691 A | | 1/1997 | Iorio et al. |
| 5,681,518 A | | 10/1997 | Ashcraft |
| 5,763,034 A | * | 6/1998 | Nishino et al. .......... 428/36.91 |
| 5,795,088 A | | 8/1998 | Wen et al. |
| 5,919,387 A | | 7/1999 | Buckley et al. |
| 5,932,306 A | * | 8/1999 | Usui ........................ 428/35.9 |

(Continued)

FOREIGN PATENT DOCUMENTS

DE    196 36 670 A1    3/1998

(Continued)

OTHER PUBLICATIONS

"NMT Nano-Molding Technology", Taiseiplas Co., Ltd.

(Continued)

*Primary Examiner*—Thomas Moulis
(74) *Attorney, Agent, or Firm*—Dykema Gossett PLLC

(57) ABSTRACT

An improved fuel rail for delivering fuel to a fuel injector for an internal combustion engine is provided that reduces the weight of the fuel injection system, greatly reduces manufacturing costs by eliminating expensive manufacturing methods, such as brazing, high heat welding, post plating, blow molding, and extrusion, and enhances low-cost, low-energy methods for attachment of fuel system components to the fuel rail. The improved fuel rail includes an tubular body defining a fluid chamber and having an inlet through which fuel enters the fluid chamber and a fuel injector port in fluid communication with the fluid chamber. The port is configured to receive the fuel injector. The tubular body is formed as a laminate having an inner metallic layer and an outer polymeric layer. The inner metallic layer may comprise aluminum and the outer polymeric layer may comprise nylon. Plastic or metal components can be attached to the laminated tubular body while providing a fluid tight, pressurized joint.

18 Claims, 3 Drawing Sheets

U.S. PATENT DOCUMENTS

| | | | |
|---|---|---|---|
| 5,972,450 A * | 10/1999 | Hsich et al. | 428/35.9 |
| 6,012,743 A | 1/2000 | Godeau et al. | |
| 6,074,717 A * | 6/2000 | Little et al. | 428/35.7 |
| 6,240,970 B1 * | 6/2001 | Ostrander et al. | 138/137 |
| 6,269,804 B1 | 8/2001 | Braun et al. | |
| 6,276,400 B1 * | 8/2001 | Jackson et al. | 138/143 |
| 6,308,686 B1 | 10/2001 | Mammarella et al. | |
| 6,308,992 B1 | 10/2001 | Mitsui et al. | |
| 6,341,597 B1 | 1/2002 | Cohen | |
| 6,365,250 B2 * | 4/2002 | Shifman et al. | 428/36.8 |
| 6,408,890 B1 | 6/2002 | Mori | |
| 6,528,125 B1 * | 3/2003 | Jackson et al. | 427/459 |
| 6,541,559 B2 | 4/2003 | Nakamura et al. | |
| 6,588,459 B2 | 7/2003 | O'Connell | |
| 6,619,264 B2 | 9/2003 | Bolsover et al. | |
| 6,626,152 B1 | 9/2003 | Deangelis et al. | |
| 6,652,939 B2 * | 11/2003 | Smith et al. | 428/35.9 |
| 6,733,047 B1 | 5/2004 | Stieler | |
| 6,832,785 B1 | 12/2004 | Zitkovic, Jr. | |
| 6,838,141 B2 * | 1/2005 | Ikemoto et al. | 428/36.91 |
| 6,960,377 B2 * | 11/2005 | Shifman | 428/36.7 |
| 6,974,614 B2 * | 12/2005 | Smith et al. | 428/35.9 |
| 7,052,751 B2 * | 5/2006 | Smith et al. | 428/35.9 |
| 2003/0018765 A1 * | 1/2003 | Muhlestein et al. | 709/223 |
| 2003/0049401 A1 | 3/2003 | Duke et al. | |
| 2004/0028861 A1 | 2/2004 | Smith et al. | |
| 2004/0142135 A1 * | 7/2004 | Verschuere et al. | 428/36.91 |
| 2005/0127668 A1 | 6/2005 | Mobley et al. | |
| 2006/0162144 A1 | 7/2006 | Stieler et al. | |
| 2006/0162697 A1 | 7/2006 | Stieler et al. | |
| 2006/0163243 A1 * | 7/2006 | Stieler et al. | 219/607 |
| 2006/0249213 A1 | 11/2006 | Stieler et al. | |

FOREIGN PATENT DOCUMENTS

| | | |
|---|---|---|
| DE | 199 53 942 A1 | 7/2000 |
| EP | 0 899 494 A1 | 3/1999 |
| EP | 1 510 746 A1 | 3/2005 |
| EP | 1 621 761 A2 | 2/2006 |
| JP | 63-215427 | 9/1988 |
| JP | 05-196187 | 8/1993 |
| JP | 06-280712 | 10/1994 |
| WO | WO 02/02978 A2 | 1/2002 |

OTHER PUBLICATIONS

International Search report issued in corresponding international application PCT/US2006/002488 (Jul. 6, 2006).

Written Opinion issued in corresponding international application PCT/US2006/002488 (Jul. 6, 2006).

English language abstract of JP 06-280712.

U.S. Appl. No. 11/535,656.

English language translation of Japanese Publication No. JP 63-215427.

English language abstract of Japanese Publication No. JP 05-196187.

Machine translation (from Japanese Pantent Office) of Japanese Publication No. 05-196187.

English language translation of Japanese Publication No. JP 06-280712.

Ashland, Inc. "EMABOND Formulated Resins for Thermoplastics Assembly" (4 pages) (obtained from www.ashchem.com/ascc/specialty/techinfo.asp).

Kagan, Val A. et al. "Recent Advances and Challenges in Induction Welding of Reinforced Nylon in Automotive Applications," SAE 2004-01-0733 (8 pages).

Nichols, Russell J., "Advances in the Emabond Induction Welding Process for High-Performance Assembly of Demanding Thermoplastics," pp. 1-10 (obtained from www.ashchem.com/ascc/specialty/techinfo.asp).

U.S. Appl. No. 11/192,913.

U.S. Appl. No. 11/208,155.

U.S. Appl. No. 11/282,648.

* cited by examiner

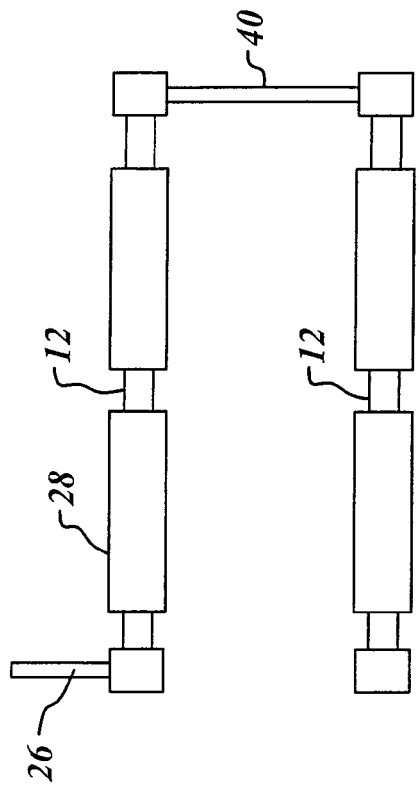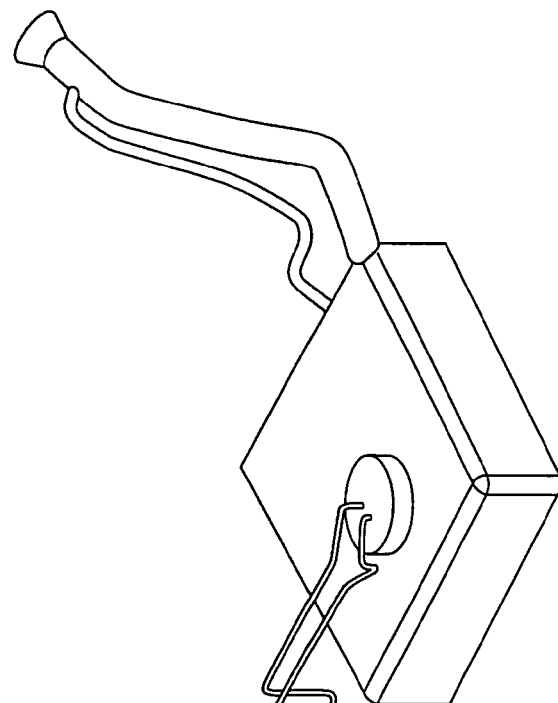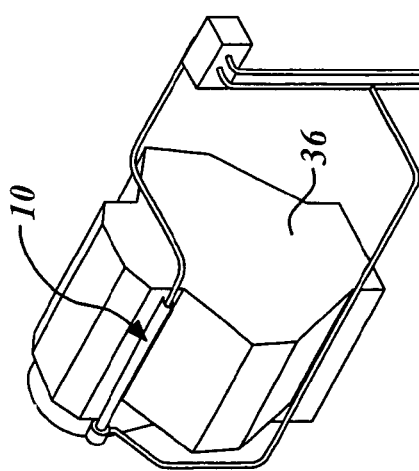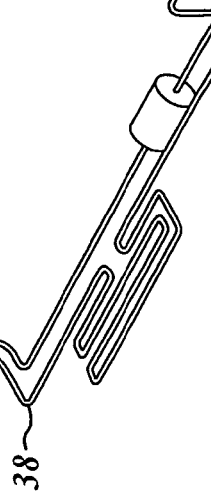
Figure 3
Figure 4

PLASTIC COATED METAL FUEL RAIL

BACKGROUND OF THE INVENTION

1. Field of the Invention

The present invention relates to a fuel rail for delivering fuel to a plurality of fuel injectors for an internal combustion engine.

2. Discussion of Related Art

A conventional fuel injection system includes a fuel rail having an elongated fuel passageway that distributes fuel to a plurality of fuel injectors through a plurality of fuel injector ports. The plurality of fuel injectors deliver fuel to an inlet port of a combustion chamber of an internal combustion engine. Direct fuel injection systems may include fuel injectors that inject fuel directly into the combustion chamber of the engine. Conventional fuel injection systems may further include a fuel pump that supplies pressurized fuel to the fuel rail from the fuel tank and a fuel pressure regulator that maintains the proper pressure within the fuel rail. Excess fuel may be returned to the fuel tank by a return line. In the alternative, so-called "returnless" fuel injection systems do not require a fuel return.

Conventional fuel rails may be made of metals, such as carbon steel or stainless steel, having a relatively high weight, thereby adding to the total weight of the vehicle with a resulting reduction in fuel economy. Furthermore, fuel rails made of carbon steel or stainless steel may be relatively expensive to manufacture because of the use of brazing, high heat welding, post plating, and other costly manufacturing methods. Fuel rails may alternatively be formed from plastic for use in less heat sensitive environments, but plastic fuel rails may also be relatively expensive to manufacture because of the use of blow molding, extrusion, and other costly manufacturing methods. Fuel rails may be configured for attachment of additional fuel vehicle system components. The materials comprising fuel rails must enable low-cost and low-energy attachment methods.

The inventors herein have recognized a need for a fuel rail that will minimize and/or eliminate the above-identified deficiencies.

SUMMARY OF THE INVENTION

The present invention provides a fuel rail for delivering fuel to a fuel injector for an internal combustion engine. The fuel rail includes a tubular body defining a fluid chamber and having an inlet through which fuel enters the fluid chamber and a fuel injector port in fluid communication with the fluid chamber. The port is configured to receive the fuel injector. The tubular body is formed as a laminate having an inner metallic layer and an outer polymeric layer.

A fuel rail in accordance with the present invention is advantageous as compared to existing fuel rails for delivering fuel to the fuel injectors for an internal combustion engine. First, a fuel rail in accordance with the present invention reduces the weight of the fuel injection system, thereby reducing the total weight of the vehicle and improving fuel economy. Second, a fuel rail in accordance with the present invention greatly reduces manufacturing costs by eliminating expensive manufacturing methods, such as brazing, high heat welding, and post plating for metal fuel rails, or blow molding and extrusion for plastic fuel rails. Third, a fuel rail in accordance with the present invention allows for the attachment of additional fuel system components to the fuel rail via significantly less expensive attachment methods, requiring a significantly lower amount of labor and energy.

These and other features and objects of this invention will become apparent to one skilled in the art from the following detailed description and the accompanying drawings illustrating features of this invention by way of example.

BRIEF DESCRIPTION OF THE DRAWINGS

FIG. 3 is a perspective view of a vehicle fuel system incorporating the fuel rail of FIG. 1.

FIG. 4 is a diagrammatic view of a fuel rail in accordance with one embodiment of the present invention.

DETAILED DESCRIPTION OF EMBODIMENTS OF THE INVENTION

Figure 1:
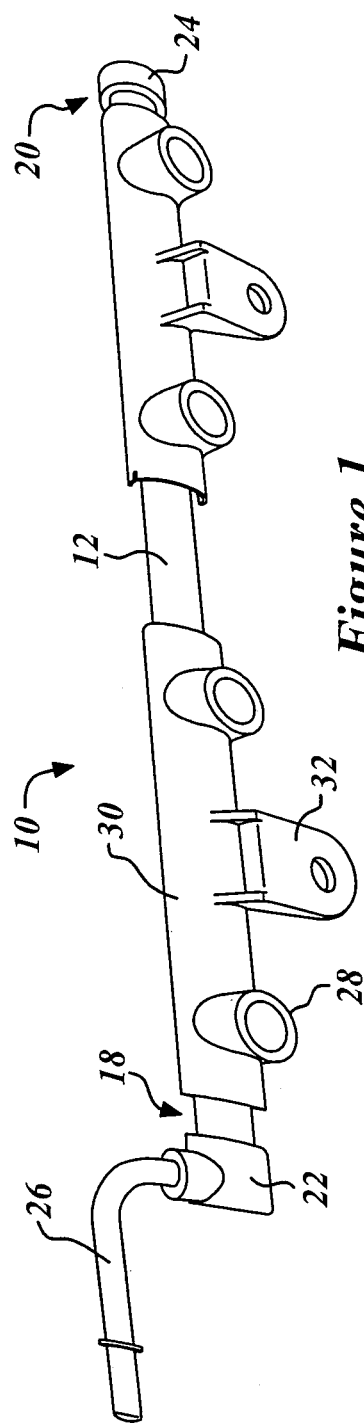
FIG. 1 is a perspective view of a fuel rail for delivering fuel to a plurality of fuel injectors for an internal combustion engine in accordance with the present invention.
Figure 2:
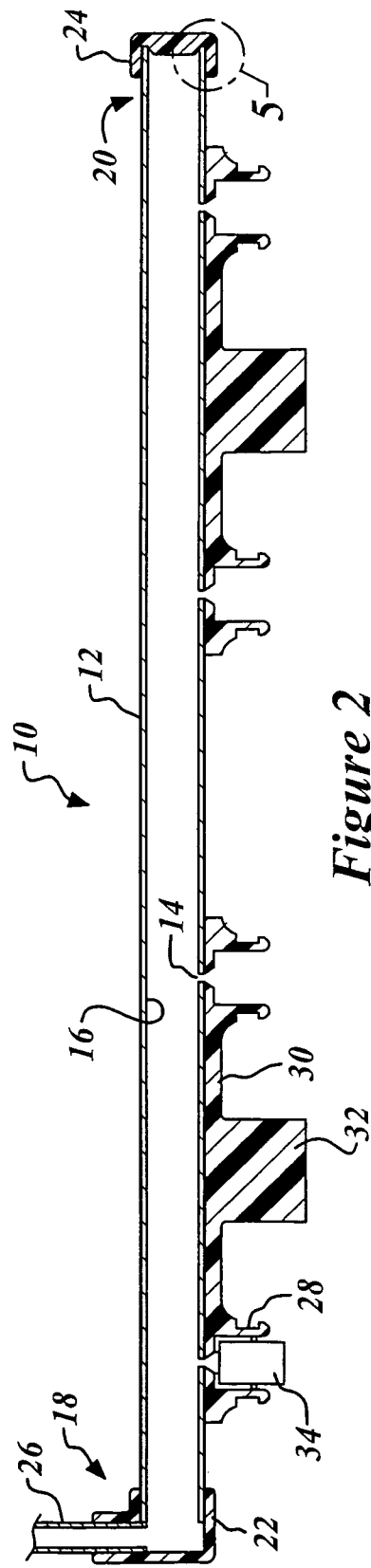
FIG. 2 is a cross-sectional view of the fuel rail of FIG. 1.

Referring now to the drawings wherein like reference numerals are used to identify identical components in the various views, FIGS. 1-2 illustrate a fuel rail 10 for delivering fuel to one or more fuel injectors for an internal combustion engine in accordance with the present invention. Fuel rail 10 is particularly adapted for use in vehicles, but may find use in other applications.

Fuel rail 10 may include a tubular body 12 defining a plurality of fuel injector ports 14 configured to receive a plurality of fuel injectors (not shown) and defining a fluid chamber 16 that serves as a fuel passageway. Tubular body 12 of fuel rail 10 may have opposite longitudinal ends 18, 20. End 18 may be open and form an inlet through which fuel enters fluid chamber 16. Accordingly, end 18 is provided for the receipt of pressurized fluid therein. Fuel is delivered to the inlet of fuel rail 12 from a fuel tank, fuel line, or other fuel reservoir components via one or more fuel supply devices (not shown). End 20 of tubular body 12 may be open or closed as described in more detail hereinbelow.

End caps 22, 24 are provided for attachment to each end 18, 20 of tubular body 12, respectively. It will be understood, however, that only one end cap may be needed where only one end 18, 20 of body 12 is open. End caps 22, 24 may close tubular body 12 and/or provide for attachment of additional components to tubular body 12. End caps 22, 24 may be comprised of plastic or other materials known by one of ordinary skill in the art to fall within the spirit and scope of the invention. End caps 22, 24 may each comprise a hollow cylindrical member with an open end and a closed end. The open end of each end cap 22, 24 may fit over end 18, 20 of tubular body 12, respectively. Each end cap 22, 24 may further include valves, dampers or other conventional components and may include ports extending in a radial direction from an outer surface of end cap 22, 24. An inlet tube 26 and/or a cross-over tube (not shown) may fit into the port extending from end cap 22 at end 18 of tubular body 12. Inlet tube 26 provides for the supply of fuel to fuel rail 10. A cross-over tube provides for the supply or return of fuel to one or more fuel chambers 16.

As stated above, tubular body 12 of fuel rail 10 may define one or more fuel injector ports 14. Ports 14 may be axially spaced and extend transverse to the longitudinal direction of body 12 and are in fluid communication with fluid chamber 16 so that fuel may be supplied to ports 14. Fuel injector ports 14 may each be configured to receive a corresponding fuel injector in the same orientation or of varying orientations relative to fuel chamber 16.

Fuel rail 10 may further include one or a plurality of pods 28 that may be attached to body 12. Pod 28 may be configured to receive a fuel injector. Pod 28 may include an integral base portion 30 configured to snap onto tubular body 12 or to be connected to body 12 using other attachment features. Base portion 30 has a shape that is complementary to the shape of body 12 and may include additional dimensional features to provide the desired interface for one of more fluid tight, high pressure joints. In the illustrated embodiment, base portion 30 is substantially C-shaped and made of an elastic material (such as any of a plurality of plastics) allowing slight deformation of base portion 30 for a snap-fit engagement with body 12. Instead of a single pod 28 being attached to tubular body 12 via base portion 30, a plurality of pods may be disposed on base portion 30 and simultaneously attached to body 12. As shown in FIG. 1, two pods 28 may share the same base portion 30. It is to be understood by one of ordinary skill in the art, however, that any number of pods 28 may be disposed on a common base portion 30 in accordance with the present invention and still fall within the spirit and scope of the invention. One or more brackets 32 may also be integral with one or more pods 28 and base portion 30 or mounted individually or together to each base portion 30 and configured to attach fuel rail 10 directly or indirectly to additional vehicle fuel system components and or an internal combustion engine.

Referring now to FIG. 3, showing a perspective view of a vehicle fuel system, fuel rail 10 is configured to deliver fuel to the fuel injectors 34 of an internal combustion engine 36. Fuel flows to the fuel injector ports 14 through chamber 16 of tubular body 12 and then through the ports 14 to the associated fuel injector 34.

Fuel injectors 34 are provided to supply fuel to an intake port (not shown) of a combustion chamber (not shown) of the internal combustion engine 36. The intake port is formed in the cylinder head (not shown) of internal combustion engine 36 and an air/fuel mixture may be provided through the intake port to the combustion chamber. Fuel injectors 34 supply fuel to each of the intake ports of the cylinder heads of the internal combustion engine 36.

A conventional fuel pressure regulator (not shown) may be secured to a flange or fitting at end 20 of fuel rail 10 via a crimped or brazed metal plug member. Normally, not all of the fuel passing through a fuel rail 10 is consumed by the fuel injectors 34. The remaining fuel passes through the fuel rail 10 to a fuel return line 38. The fuel pressure regulator meters fuel flow to the return line 38 and maintains a desired fuel pressure within fuel rail 10. The excess fuel may be pumped back to the fuel tank or to a reserve tank, from an outlet of fuel rail 10 at end 20. In some designs, a fuel pressure damper is employed at a point upstream of the fuel rail 10. A fuel rail 10 in accordance with the present invention may also be used in connection with so-called "returnless" fuel injection systems. In "returnless" fuel injection systems, end 20 of tubular body 12 may be closed to prevent the exit of fuel. "Returnless" fuel injection systems do not utilize a fuel pressure regulator or return line 38.

Referring to FIG. 4, many typical internal combustion engines have at least two banks of cylinders. In a conventional fuel injection system, a fluid chamber 16 is provided for each bank of cylinders. Accordingly, two tubular bodies each having a fuel chamber 16 may be provided when the internal combustion engine has two banks of cylinders. If multiple fluid chambers 16 are employed, they may be connected by one or more cross-over tubes 40. The fluid chambers 16 and one or more cross-over tubes 40 may comprise an integral fuel rail 10 or comprise separate pieces. One or more cross-over tubes 40 are provided to connect fluid chambers 16, since fuel is usually supplied from a fuel pump into only one of the chambers 16. Cross-over tube 40 may be in fluid communication with the fluid chambers 16 defined by the tubular bodies 12 of the fuel rail.

Referring again to FIG. 2, tubular body 12 may have a substantially circular cross-sectional configuration. Alternatively, body 12 may have a substantially non-circular cross-sectional configuration, such as a substantially rectangular or substantially oval configuration. It is to be understood that any number of cross-sectional configurations may be employed, such as elliptical, trapezoidal, or hourglass-shaped cross-sectional configurations that remain within the spirit and scope of the invention.

Figure 5:
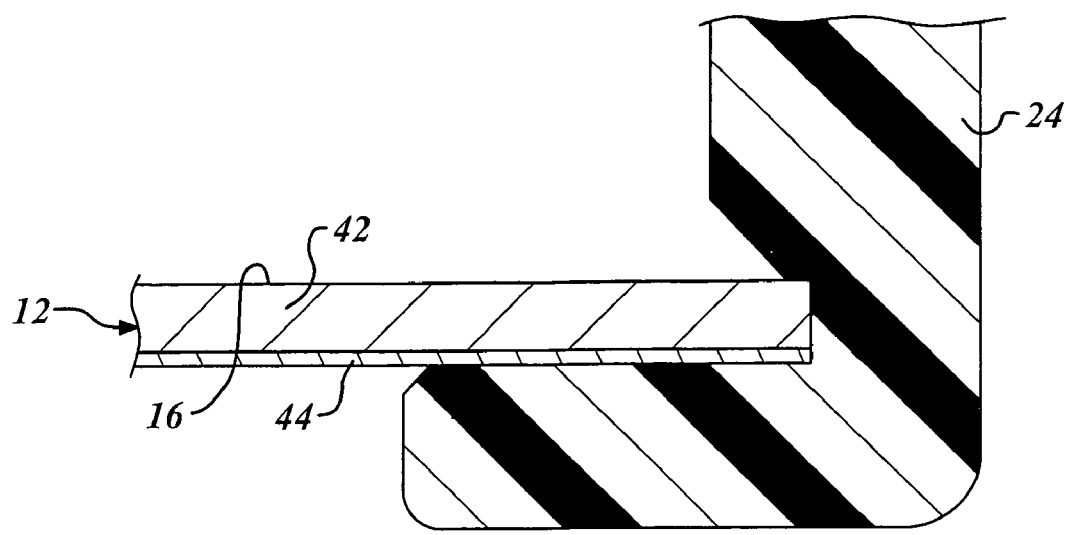
FIG. 5 is an enlarged view of a portion of FIG. 2.

Referring now to FIG. 5, in accordance with the present invention tubular body 12 may be formed as a laminate having an inner layer 42 and an outer layer 44. As used herein, the term "inner" layer and "outer" layer are used to describe the relative position of layers 42, 44 to one another. The use of "inner" and "outer" does not mean that the "inner" layer is the innermost layer, that the "outer" layer is the outermost layer, or that there cannot be layers in between layers 42, 44. Layer 42 is a metallic layer and may comprise steel or, in a preferred embodiment, aluminum. The thickness of the inner metallic layer 42 may measure substantially 0.1 mm to 2.0 mm. However, although this thickness is described in detail, it is to be understood that those of ordinary skill in the art will recognize that the inner metallic layer may be thicker or thinner and still fall within the spirit and scope of the invention. Outer layer 44 is a polymeric layer, and preferably a plastic layer (in particular a thermoplastic layer) and comprises nylon in a preferred embodiment. Nylon refers to a family of polyamides generally characterized by the presence of the amide group, —CONH. In a preferred embodiment, the nylon is of a type known as nylon 12. Outer layer 44 may measure substantially 150 microns in thickness, but may preferably range between about 80 and about 500 microns. Again, however, it is to be understood that those of ordinary skill in the art will recognize that the outer polymeric layer may be thicker or thinner and still fall within the spirit and scope of the invention.

Figure 6:
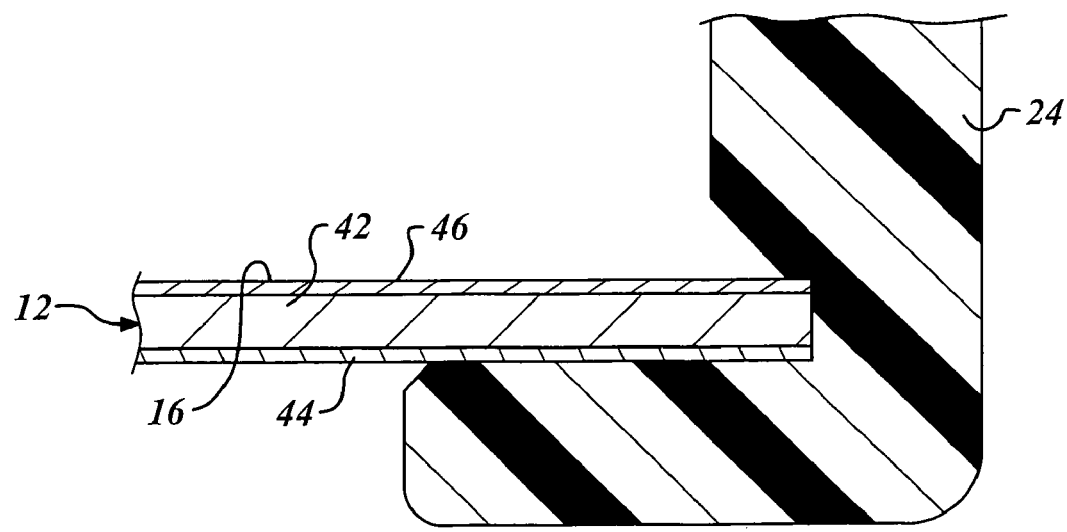
FIG. 6 is an enlarged cross-sectional view of a portion of a fuel rail in accordance with another embodiment of the present invention.

Outer layer 44 may be directly adjacent to the inner layer 42 and may be extruded over, or otherwise pre-bonded to, inner layer 42. Alternatively, body 12 may include additional layers disposed between inner layer 42 and outer layer 44 or additional layers may be formed inwardly of inner layer 42. Referring to FIG. 6 a layer 46 may be disposed radially inwardly of layer 42. Layer 46 may comprise another polymeric layer and particularly a plastic (in particular a thermoplastic) layer. Further, either of layers 42, 44 may comprise a plurality of sub-layers. For example layer 42 may comprise a plurality of polymeric sublayers having different compositions.

A fuel rail 10 in accordance with the present invention has many advantages as compared to various conventional fuel rails. In particular, fuel rail 10 is significantly lighter than conventional fuel rails thereby reducing the weight of the fuel injection system and the total weight of the vehicle and improving fuel economy. In accordance with this invention, this hybrid material fuel rail uses plastic components attached to an metal tubular body which provides the required structural strength while providing advantages in weight, material costs and manufacturing costs.

Fuel rail 10 provides additional advantages relative to conventional fuel rails in both manufacturing and assembly as described more fully in the commonly-assigned U.S. patent applications Ser. Nos. 11/042,013 and 11/042,014 titled "Method of Coupling Fuel System Components" filed on Jan. 25, 2005 and naming David Stieler, Dale Sleep and Brian Cheadle, the entire disclosures of which are incorporated herein by reference. First, the inventive fuel rail 10 greatly reduces manufacturing costs because it can be manufactured without conventional, expensive manufacturing methods such as brazing, high heat welding, and post plating for typical metal fuel rails, or blow molding and extrusion for typical plastic fuel rails. Second, various components can be attached to body 12 of fuel rail 10 with less energy or cost using methods including, but not limited to, ultrasonic, vibration and induction heat welding. When using the induction head welding process, various components can be bonded to an outer surface of body 12 by generating heat transfer from the inner metal layer 42 to the outer polymeric layer 44 to deform the outer layer of body 12 and, for example, the base 30 of pod 28, to create one or more fluid tight, pressurized joints. When using ultrasonic or vibration welding, various components can be bonded to an outer surface of body 12 by generating frictional heat between the outer surface of body 12 and, for example, the base 30 of pod 28, thereby creating one or more fluid tight, pressurized joints. Among the components described herein which can be affixed directly or indirectly to body 12 in this manner are end caps 22, 24, inlet tube 26, pods 28 (with or without base portion 30 and/or bracket 32) and cross-over tube 40. It should be understood, however, that other components may be similarly joined. The inlet tube 26, crossover tube 40 and other tubes that may affix directly or indirectly to body 12 are preferably of a similar laminate construction as shown in FIG. 4 or 6.

While the invention has been particularly shown and described with reference to the preferred embodiments thereof, it is well known by those skilled in the art that various changes and modifications can be made in the invention without departing from the spirit and scope of the invention.

We claim:

1. A fuel rail for delivering fuel to a first fuel injector for an internal combustion engine, comprising:
    a first tubular body defining a fluid chamber and having an inlet through which fuel enters said fluid chamber and a fuel injector port in fluid communication with said fluid chamber, said port configured to receive said first fuel injector
    wherein said first tubular body is a laminate having an inner metallic layer and an outer polymeric layer
    further comprising a fuel system component bonded to said outer layer of said first tubular body.

2. The fuel rail of claim 1 wherein said inner layer comprises aluminum.

3. The fuel rail of claim 2 wherein said outer layer comprises nylon.

4. The fuel rail of claim 1 wherein said outer layer comprises a plastic.

5. The fuel rail of claim 4 wherein said outer layer comprises nylon.

6. The fuel rail of claim 1 wherein said inner layer comprises steel.

7. The fuel rail of claim 1 wherein said outer layer is directly adjacent said inner layer.

8. The fuel rail of claim 1 wherein said outer layer is extruded over said inner layer.

9. The fuel rail of claim 1, further comprising a second tubular body defining a fluid chamber and having an inlet through which fuel enters said fluid chamber of said second tubular body and a fuel injector port in fluid communication with said fluid chamber of said second tubular body, said port of said second tubular body configured to receive a second fuel injector.

10. The fuel rail of claim 1 wherein said first tubular body further includes another polymeric layer disposed inwardly of said inner metallic layer.

11. The fuel rail of claim 1 wherein said fuel system component is bonded to said outer layer of said first tubular body by generating heat transfer from said inner layer of said first tubular body to said outer layer of said first tubular body and deforming said outer layer of said first tubular body.

12. The fuel rail of claim 1 wherein said component comprises a pod configured to receive said first fuel injector.

13. The fuel rail of claim 1 wherein said component comprises a member with first and second pods, said first and second pods configured to receive said first fuel injector and a second fuel injector, respectively.

14. The fuel rail of claim 1 wherein said component comprises a bracket.

15. The fuel rail of claim 1 wherein said component comprises a cap disposed about an open end of said first tubular body.

16. The fuel rail of claim 1 further comprising a second tubular body defining a fluid chamber and having an inlet through which fuel enters said fluid chamber of said second tubular body and a fuel injector port in fluid communication with said fluid chamber of said second tubular body, said port of said second tubular body configured to receive a second fuel injector wherein said component comprises a cross-over tube in fluid communication with said fluid chamber of said first tubular body and said fluid chamber in said second tubular body.

17. The fuel rail of claim 1 further comprising a second tubular body defining a fluid chamber and having an inlet through which fuel enters said fluid chamber of said second tubular body and a fuel injector port in fluid communication with said fluid chamber of said second tubular body, said port of said second tubular body configured to receive a second fuel injector wherein said component comprises an inlet tube in fluid communication with said fluid chamber of said first tubular body and said fluid chamber of said second tubular body.

18. The fuel rail of claim 1 wherein said component comprises a bracket configured to secure said first tubular body to another fuel system component.

* * * * *